(12) United States Patent
Florea et al.

(10) Patent No.: US 9,291,101 B2
(45) Date of Patent: Mar. 22, 2016

(54) GAS TURBINE ENGINE INLET WALL DESIGN

(71) Applicant: UNITED TECHNOLOGIES CORPORATION, Hartford, CT (US)

(72) Inventors: Razvan Virgil Florea, Mancheser, CT (US); Claude G. Matalanis, Longmeadow, MA (US); Mark B. Stucky, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 52 days.

(21) Appl. No.: 14/185,045

(22) Filed: Feb. 20, 2014

(65) Prior Publication Data
US 2015/0122952 A1 May 7, 2015

Related U.S. Application Data

(60) Provisional application No. 61/770,506, filed on Feb. 28, 2013.

(51) Int. Cl.
*B64D 33/02* (2006.01)
*F02C 7/04* (2006.01)
*B64D 27/20* (2006.01)

(52) U.S. Cl.
CPC . *F02C 7/04* (2013.01); *B64D 27/20* (2013.01); *B64D 33/02* (2013.01); *B64D 2033/0286* (2013.01); *F05D 2220/36* (2013.01); *F05D 2250/14* (2013.01); *Y10T 137/0536* (2015.04)

(58) Field of Classification Search
CPC .... B64D 33/02; B64D 29/06; B64D 2241/00; Y10T 137/0536
USPC .................. 244/53 B, 54; 137/15.1; 181/214
See application file for complete search history.

(56) References Cited

U.S. PATENT DOCUMENTS

| | | | | |
|---|---|---|---|---|
| 3,583,661 A * | 6/1971 | Stake | .......................... | 244/53 B |
| 4,787,421 A * | 11/1988 | Yu | ................................ | 138/178 |
| 5,105,615 A * | 4/1992 | Herzog | ........................... | 60/803 |
| 5,150,571 A * | 9/1992 | Herzog | ........................ | 60/200.1 |
| 5,915,403 A * | 6/1999 | McConachie et al. | ....... | 137/15.1 |
| 7,631,836 B2 * | 12/2009 | Lebas | ........................... | 244/53 B |
| 7,784,732 B2 * | 8/2010 | Owens et al. | ............... | 244/53 B |
| 8,096,131 B2 | 1/2012 | Ziaei | | |
| 8,262,780 B2 | 9/2012 | Smithies et al. | | |
| 2005/0258307 A1 * | 11/2005 | Lebas | ......................... | 244/53 B |
| 2008/0164378 A1 * | 7/2008 | Owens et al. | ............... | 244/53 B |

(Continued)

FOREIGN PATENT DOCUMENTS

| | | | |
|---|---|---|---|
| EP | 1243782 B2 * | 7/2013 | |
| FR | 2680830 A1 * | 3/1993 | |
| WO | WO 2008017567 A1 * | 2/2008 | ............. B64D 33/02 |

*Primary Examiner* — Benjamin P Lee
(74) *Attorney, Agent, or Firm* — Carlson, Gaskey & Olds, PC

(57) ABSTRACT

A gas turbine engine has an inlet duct formed to have a shape with a first ellipse in one half and a second ellipse in a second half. The second half has an upstream most end which is smaller than the first ellipse. The inlet duct has a surface defining the second ellipse which curves away from the first ellipse, such that the second ellipse is larger at an intermediate location. The second ellipse is even larger at a downstream end of the inlet duct leading into a fan.

10 Claims, 2 Drawing Sheets

(56) References Cited

U.S. PATENT DOCUMENTS

| | | | |
|---|---|---|---|
| 2010/0108802 A1* | 5/2010 | Marche et al. | 244/54 |
| 2011/0108676 A1* | 5/2011 | Colaprisco et al. | 244/53 B |
| 2012/0138736 A1* | 6/2012 | Cazals et al. | 244/54 |
| 2015/0030445 A1* | 1/2015 | Gonidec et al. | 415/220 |
| 2015/0030446 A1* | 1/2015 | Gonidec et al. | 415/220 |

* cited by examiner

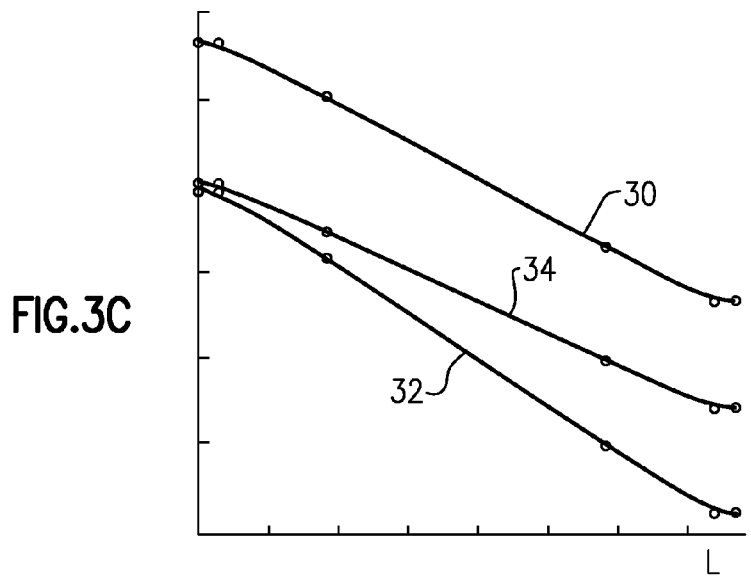
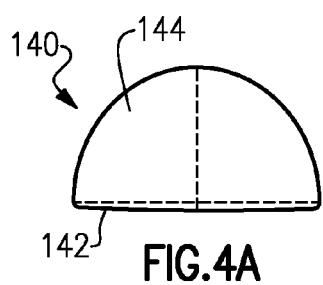
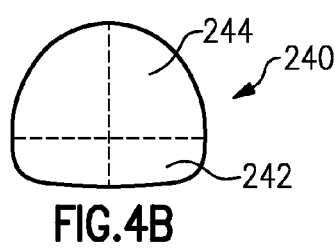
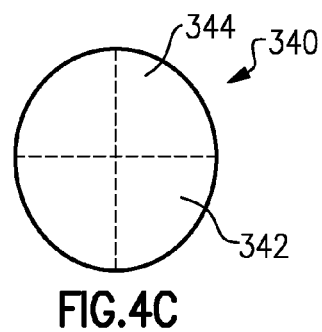
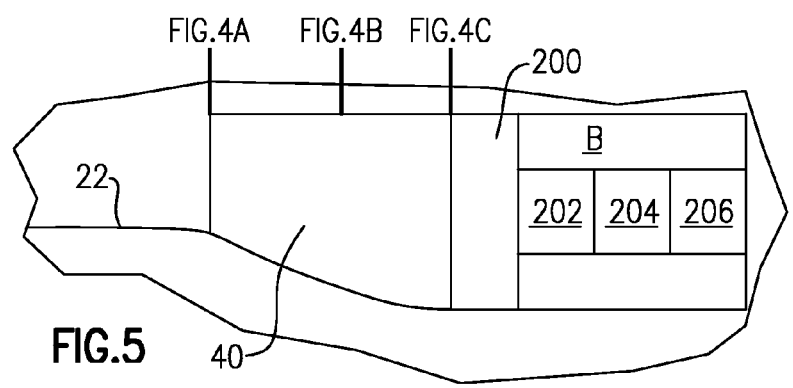
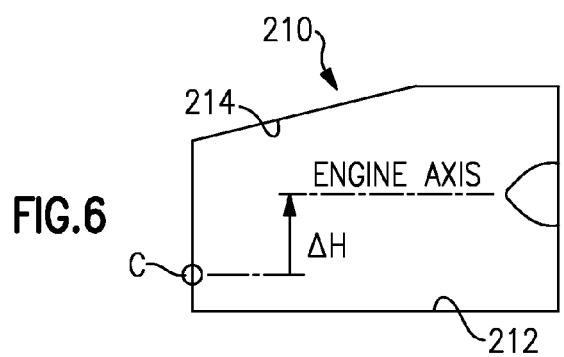

GAS TURBINE ENGINE INLET WALL DESIGN

CROSS-REFERENCE TO RELATED APPLICATION

This application claims priority to U.S. Provisional Application No. 61/770,506, filed Feb. 28, 2013.

STATEMENT REGARDING FEDERALLY SPONSORED RESEARCH OR DEVELOPMENT

This invention was made with government support under Contract No. NNC07CB59C, awarded by NASA. The Government has certain rights in this invention.

BACKGROUND

This application relates to an inlet wall design for use in an embedded gas turbine engine.

Gas turbine engines are known and typically include a fan delivering air into a bypass duct and into a core engine. In the core engine the air is compressed at a compressor and then mixed with fuel and ignited in a combustion section. Products of the combustion pass downstream over turbine rotors, driving them to rotate.

Gas turbine engines have historically been mounted on a tail or beneath the wings of an aircraft. However, a next generation of aircraft seeks to dramatically increase fuel efficiency, reduce emissions, and decrease fuel burn. A design for such aircraft utilizes a blended wing design wherein the body and wing merge smoothly into each other. Such designs have typically been proposed with embedded engines, which are mounted within a fuselage or body of the aircraft.

In such an engine, the area upstream of an inlet to the engine is different on circumferential locations adjacent to the body than at locations spaced away from the body. A boundary layer or area of low momentum air will be formed leading into the inlet and the fan at circumferential locations associated with the body.

SUMMARY

In a featured embodiment, a gas turbine engine has an inlet duct formed to have a shape with a first ellipse in one half and a second ellipse in a second half. The second half has an upstream most end which is smaller than the first ellipse. The inlet duct has a surface defining the second ellipse which curves away from the first ellipse, such that the second ellipse is larger at an intermediate location. The second ellipse is even larger at a downstream end of the inlet duct leading into a fan.

In another embodiment according to the previous embodiment, a center of the inlet duct cross-section is defined between the first and second ellipses and, a distance between the center and the surface defining the said second ellipse increasing as one moves further into the inlet duct and toward the fan.

In another embodiment according to any of the previous embodiments, a vertical semi-axis of the first ellipse is generally constant from the upstream end to the downstream end.

In another embodiment according to any of the previous embodiments, the first ellipse is in a vertically upper half of the inlet duct.

In another embodiment according to any of the previous embodiments, the first ellipse is in a vertically lower half of the inlet duct.

In another featured embodiment, a blended wing aircraft has a blended wing fuselage and at least one embedded gas turbine engine in the fuselage. The gas turbine engine has an inlet duct formed to have a first ellipse in one half and a second ellipse in a second half. The second half has an upstream most end which is smaller than the first ellipse. The inlet duct has a surface defining the second ellipse which curves away from the first ellipse, such that the second ellipse is larger at an intermediate location. The second ellipse is even larger at a downstream end of the inlet duct leading into a fan.

In another embodiment according to any of the previous embodiments, a center of the inlet duct cross-section is defined between the first and second ellipses and, a distance between the center and the surface defining the second ellipse increasing as one moves further into the inlet duct and toward the fan.

In another embodiment according to any of the previous embodiments, a vertical semi-axis of the first ellipse is generally constant from the upstream end to the downstream end.

In another embodiment according to any of the previous embodiments, the first ellipse is in a vertically upper half of the inlet duct.

In another embodiment according to any of the previous embodiments, the first ellipse is in a vertically lower half of the inlet duct.

These and other features may be best understood from the following drawings and specification.

BRIEF DESCRIPTION OF THE DRAWINGS

FIG. 3C shows a graph of one inlet duct design.

FIG. 4A shows the inlet duct at an upstream most location.

FIG. 4B shows the inlet duct at an intermediate location.

FIG. 4C shows the inlet duct immediately upstream of a fan.

FIG. 5 schematically shows an engine.

FIG. 6 shows a second inlet duct.

DETAILED DESCRIPTION

Figure 1:
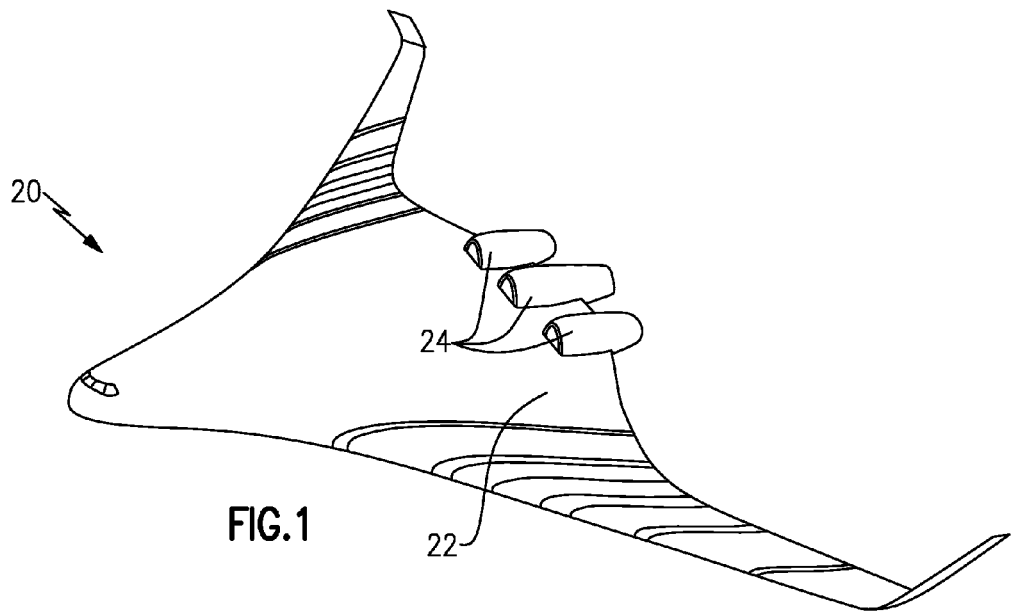
FIG. 1 shows a blended wing aircraft.

An aircraft 20 is illustrated in FIG. 1 having a blended wing body or fuselage 22 and a plurality of embedded gas turbine engines 24. As known, the embedded gas turbine engines 24 include a fan at an upstream location delivering air into a compressor and into a bypass duct. The air is mixed with fuel and ignited in a combustor downstream of the compressor and products of that combustion pass downstream over turbine rotors driving them to rotate.

Figure 2:
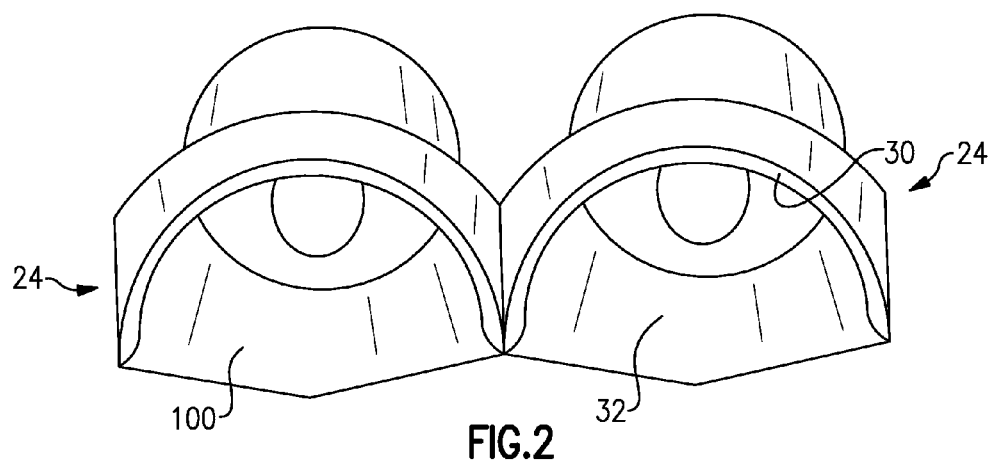
FIG. 2 shows an inlet duct for a gas turbine engine as may be included in the FIG. 1 embodiment.

There are challenges with regard to the embedded gas turbine engines 24. As an example, as shown in FIG. 2, an upstream most end 100 of an embedded gas turbine engine 24 will sit on the fuselage 22. There will be a boundary layer leading into a bottom surface 32 of an inlet duct for the engine 24. As shown, in this design a shape of the bottom or lower surface 32 is closer to a horizontal shape and an upper or top surface 30 is closer to a cylindrical shape.

Applicant has designed the shape of the inlet duct by utilizing ellipses and optimizing the curves, lengths and shape of the overall duct.

Figure 3A:
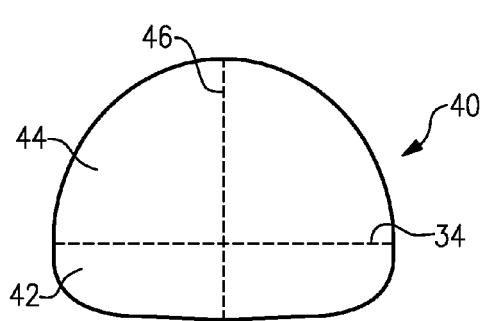
FIG. 3A shows a first geometric consideration for an inlet duct.

As shown in FIG. 3A, the shape of inlet duct 40 may be a super ellipse, having a first ellipse 44 at an upper surface or spaced away from the fuselage 22 and a second ellipse 42 at a lower portion or spaced adjacent to the fuselage 22. A center line 34 is defined to separate ellipses 42 and 44. A formula for calculating the shape of the ellipses may be:

$$[X/a]^P + [Y/b]^q = 1$$

In this formula a and b are constants (known as ellipse semi-axes) corresponding to a half-width of the inlet and a height derived from the center line 34 and the upper/lower walls respectively. The constants p and q are exponents which shape the ellipses. The values of the constants for each quarter of a super ellipse are a function of the cross-sectional area, which varies linearly as a function of axial position.

Figure 3B:
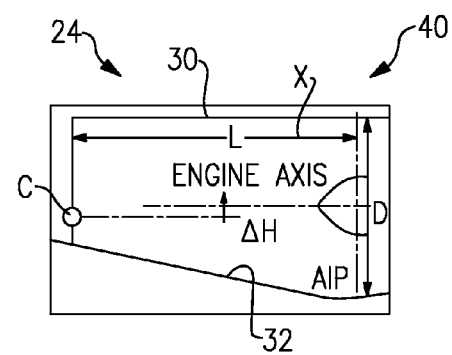
FIG. 3B shows another dimension of the inlet duct.

FIG. 3B shows the inlet duct 40 varying over an axial length. As shown, the centroid C or line 34 is spaced below a central axis of the engine X. As can be appreciated, the bottom surface 32 curves away from the upper surface 30. The vertical ellipse semi-axis corresponding to upper surface 30 varies linearly, with the axial position, while the vertical ellipse semi-axis corresponding to lower surface 32 can be seen to expand away from the center C as one moves into the inlet duct 40.

FIG. 3C graphically shows the location of the center 34, the bottom surface 32, and the upper or top surface 30 as one moves further into the engine, or locations L. As can be appreciated, the vertical ellipse semi-axes corresponding to surfaces 30 and 32 generally vary linearly with the axial position.

As shown in FIG. 4A, at the inlet end 140 of the inlet duct, the super ellipse has a very small area lower ellipse 142 and an upper ellipse 144, which is of a much larger area. This may be at the upstream most point on the inlet duct and immediately downstream of the fuselage 22.

FIG. 4B shows another location 240 which is somewhat intermediate in the duct, and wherein the lower ellipse 242 has a much larger area than it was in the FIG. 4A. The ellipse 244 may be generally the same as ellipse 144.

FIG. 4C shows a downstream location 340 wherein the ellipses 342 and 344 are generally equal in area. Immediately downstream of this location would be the fan, which is shown schematically in FIG. 5 at 200. A bypass duct B is shown. As known, a core engine including compressor 202, combustion section 204 and turbine 206 is downstream of the fan 200. In fact, as can be appreciated, the ellipses which form the inlet duct could be said to have a first set of ellipses as the lower ellipses 142/242/342, and a second set of ellipses as the upper ellipses 144/244/344.

By designing the inlet duct 40 according to the teachings above, the airflow will be more uniform by the time it reaches the fan 200, and the effects of the boundary layer from the fuselage 22 will be dramatically reduced.

FIG. 6 shows another duct embodiment 210. In duct embodiment 210, the lower or bottom surface 212 is formed such that it has a generally constant vertical semi-axis, while the upper or top surface 214 expands much like the lower surface 32 of the FIG. 3B embodiment.

A worker of ordinary skill in this art would recognize when either of the inlet shape options would be most efficient to utilize. Of course, other shapes may be utilized as well.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
an inlet duct formed to have a shape with a first set of ellipse sections along one longitudinal half and a second set of ellipse sections along a second longitudinal half, with said second set of ellipse sections having an upstream most end which is smaller in area than an area of an upstream most end of said first set of ellipse sections, and said inlet duct having a surface defining said second set of ellipse sections which curves away from said first set of ellipse sections, such that said second set of ellipse sections has a larger area at an intermediate location, and said second set of ellipse sections has an even larger area at a downstream end of said inlet duct leading into a fan.

2. The gas turbine engine as set forth in claim 1, wherein a center of the inlet duct cross-section is defined between said first and second sets of ellipse sections and, a distance between said center and said surface defining said second set of ellipse sections increasing as one moves further into said inlet duct and toward said fan.

3. The gas turbine engine as set forth in claim 2, wherein a vertical semi-axis of said first set of ellipse sections is generally constant from said upstream end to said downstream end.

4. The gas turbine engine as set forth in claim 3, wherein said first set of ellipse sections is in a vertically upper half of said inlet duct.

5. The gas turbine engine as set forth in claim 3, wherein said first set of ellipse sections is in a vertically lower half of said inlet duct.

6. A blended wing aircraft comprising:
a blended wing fuselage and at least one embedded gas turbine engine in said fuselage; and
said gas turbine engine having an inlet duct formed to have a first set of ellipse sections along one longitudinal half and a second set of ellipse sections in a second longitudinal half, with said second set of ellipse sections having an upstream most end which is smaller in area than an area of an upstream most end said first set of ellipse sections, and said inlet duct having a surface defining said second set of ellipse sections which curves away from said first set of ellipse sections, such that said second set of ellipse sections has a larger area at an intermediate location, and said second set of ellipse sections has an even larger area at a downstream end of said inlet duct leading into a fan.

7. The blended wing aircraft as set forth in claim 6, wherein a center of the inlet duct cross-section is defined between said first and second sets of ellipse sections and, a distance between said center and said surface defining said second set of ellipse sections increasing as one moves further into said inlet duct and toward said fan.

8. The blended wing aircraft as set forth in claim 7, wherein a vertical semi-axis of the first set of ellipse sections is generally constant from said upstream end to said downstream end.

9. The blended wing aircraft as set forth in claim 8, wherein said first set of ellipse sections is in a vertically upper half of said inlet duct.

10. The blended wing aircraft as set forth in claim 8, wherein said first set of ellipse sections is in a vertically lower half of said inlet duct.

* * * * *